US008824174B2

(12) United States Patent
Lai et al.

(10) Patent No.: US 8,824,174 B2
(45) Date of Patent: Sep. 2, 2014

(54) CONTROL SYSTEM AND METHOD FOR A UNIVERSAL POWER CONDITIONING SYSTEM

(75) Inventors: Jih-Sheng Lai, Blacksburg, VA (US);
Sung Yeul Park, Blacksburg, VA (US);
Chien-Liang Chen, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 312 days.

(21) Appl. No.: 12/036,087

(22) Filed: Feb. 22, 2008

(65) Prior Publication Data

US 2008/0205096 A1 Aug. 28, 2008

Related U.S. Application Data

(60) Provisional application No. 60/891,118, filed on Feb. 22, 2007.

(51) Int. Cl.
*H02M 1/12* (2006.01)
*H02M 7/5387* (2007.01)
*H02J 3/38* (2006.01)

(52) U.S. Cl.
CPC .............. *H02J 3/38* (2013.01); *Y02B 70/1441* (2013.01); *H02M 7/53871* (2013.01)
USPC ........................................................ 363/40

(58) Field of Classification Search
USPC ............ 363/39, 40, 43, 50, 51, 55, 56.01, 78, 363/95, 98, 133; 307/44, 64
See application file for complete search history.

(56) References Cited

U.S. PATENT DOCUMENTS 7,417,336 B2 * 8/2008 Johnson ........................... 307/22
7,526,346 B2 * 4/2009 Kolodziej ....................... 700/45

(Continued)

FOREIGN PATENT DOCUMENTS

CN 1728496 A 2/2006
EP 0438059 A2 7/1991

(Continued)

OTHER PUBLICATIONS

Qiang Zhang, Lewei Qian, Chonwei Zhang and David Cartes. "Study on Grid Connected Inverter Used in High Power Wind Generation System", 2006, IEEE, pp. 1053-1058.*

(Continued)

*Primary Examiner* — Adolf Berhane
*Assistant Examiner* — Jeffrey Gblende
(74) *Attorney, Agent, or Firm* — Tracy Jong Law Firm; Tracy P. Jong; Louis Reale

(57) ABSTRACT

A new current loop control system method is proposed for a single-phase grid-tie power conditioning system that can be used under a standalone or a grid-tie mode. This type of inverter utilizes an inductor-capacitor-inductor (LCL) filter as the interface in between inverter and the utility grid. The first set of inductor-capacitor (LC) can be used in the standalone mode, and the complete LCL can be used for the grid-tie mode. A new admittance compensation technique is proposed for the controller design to avoid low stability margin while maintaining sufficient gain at the fundamental frequency. The proposed current loop controller system and admittance compensation technique have been simulated and tested. Simulation results indicate that without the admittance path compensation, the current loop controller output duty cycle is largely offset by an undesired admittance path. At the initial simulation cycle, the power flow may be erratically fed back to the inverter causing catastrophic failure. With admittance path compensation, the output power shows a steady-state offset that matches the design value. Experimental results show that the inverter is capable of both a standalone and a grid-tie connection mode using the LCL filter configuration.

15 Claims, 9 Drawing Sheets

(56) References Cited

U.S. PATENT DOCUMENTS

| | | | |
|---|---|---|---|
| 2004/0080966 A1* | 4/2004 | Chadwick et al. | 363/132 |
| 2004/0145357 A1* | 7/2004 | Lynch et al. | 323/208 |
| 2004/0170038 A1* | 9/2004 | Ichinose et al. | 363/95 |
| 2005/0141248 A1* | 6/2005 | Mazumder et al. | 363/39 |
| 2006/0127720 A1* | 6/2006 | Ferrall et al. | 429/22 |
| 2006/0166619 A1* | 7/2006 | Roberts | 455/39 |
| 2006/0171182 A1* | 8/2006 | Siri et al. | 363/131 |
| 2006/0214509 A1* | 9/2006 | Dai et al. | 307/11 |
| 2007/0055408 A1 | 3/2007 | Delmerico et al. | |
| 2007/0139122 A1* | 6/2007 | Nagarkatti et al. | 330/302 |
| 2007/0263418 A1* | 11/2007 | Ponnaluri et al. | 363/39 |

FOREIGN PATENT DOCUMENTS

| | | |
|---|---|---|
| EP | 0519635 A2 | 12/1992 |
| EP | 1560312 A2 | 8/2005 |

OTHER PUBLICATIONS

Louganski et al., "Current phase lead compensation in single-phase PFC boost converters with a reduced switching frequency to line frequency ratio", IEEE 2006.*

Sera et al. "Low-Cost Digital Implementation of Proportional-Resonant Current Controllers for PV Inverter Applications Using Delta Operator", IEEE 2005.*

Konstantin P. Louganski and Jih-Shen Lai, "Current Phase Lead Compensation in Single-Phase PFC Boost Converters with a Reduced Switching Frequency to Line Ratio," IEEE Trans. Power Electron., vol. 22, No. 1, pp. 113-119, Jan. 2007. See abstract; figures 10-13; pp. 262-266.

Qiang Zhang, Lewei Qian, Chongwei Zhang and D. Cartes, "Study on Grid Connected Inverter Used in High Power Wind Generation System," in Proc. IEEE Industry Applications Conference, vol. 2, pp. 1053-1058, Oct. 2006. See abstract; figures 1-2; pp. 1054-1055.

Seshadri Sivakumar, Tom Parsons and Shyamala C. Sivakumar, "Modeling, Analysis and Control of Bidirectional Power Flow in Grid Connected Inverter Systems," in Proc. IEEE Power Conversation Conference, vol. 3, pp. 1015-1019, Apr. 2002. See abstract; figures 1a and 1b.

Sung-Yeul Par, Jih-Sheng Lai, Chien-Liang Chen and Tae-Won Chun, "Current Loop Control with Admittance Compensation for a Single-Phase Grid-Tie Fuel Cell Power Conditioning System," in Proc. IEEE Appl. Power Electron. Conf., pp. 654-660, Feb. 25, 2007. See abstract; figure 1; pp. 655-657.

Chien-Liang Chen, Sung-Yeul Park, Jih-Sheng Lai and Seung-Ryul Moon, "Admittance Compensation in Current Loop Control for a Grid-Tie LCL Fuel Cell Inverter," in Proc. IEEE Power Electronics Specialists Conference, pp. 520-526, Jun. 17, 2007. See abstract; figure 1; pp. 521-523.

Sera, et al. "Low-Cost Digital Implementation of Proportional-Resonant Current Controllers for PV Inverter Applications Using Delta Operator", IEEE Industrial Elecronics Society Conf. 2005, 7 pages.

* cited by examiner

FIG. 9
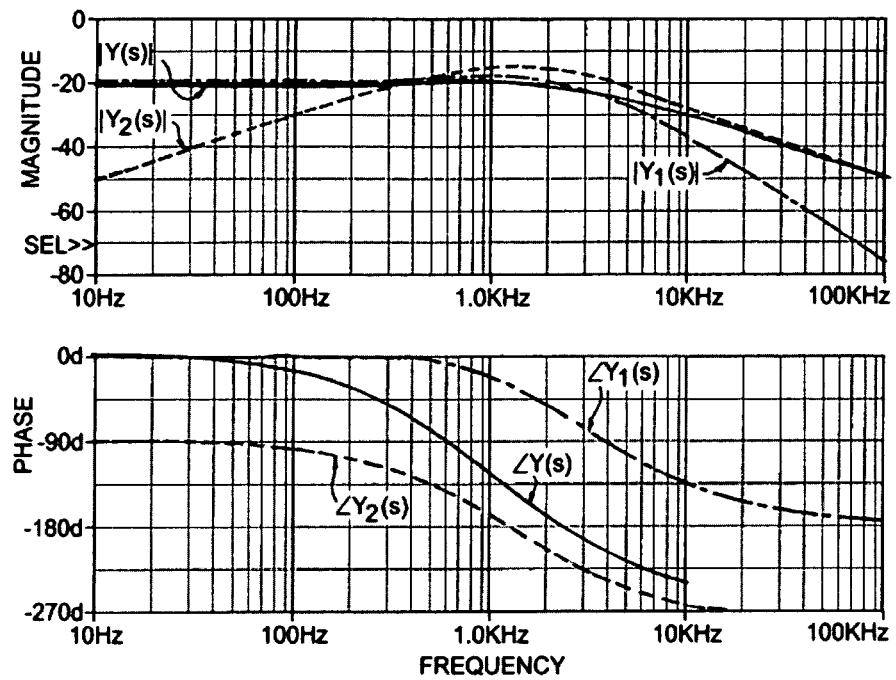
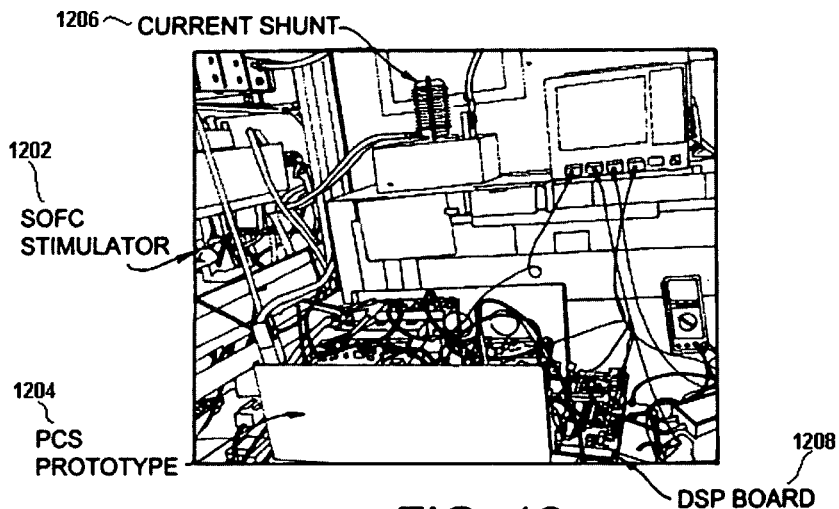
FIG. 12

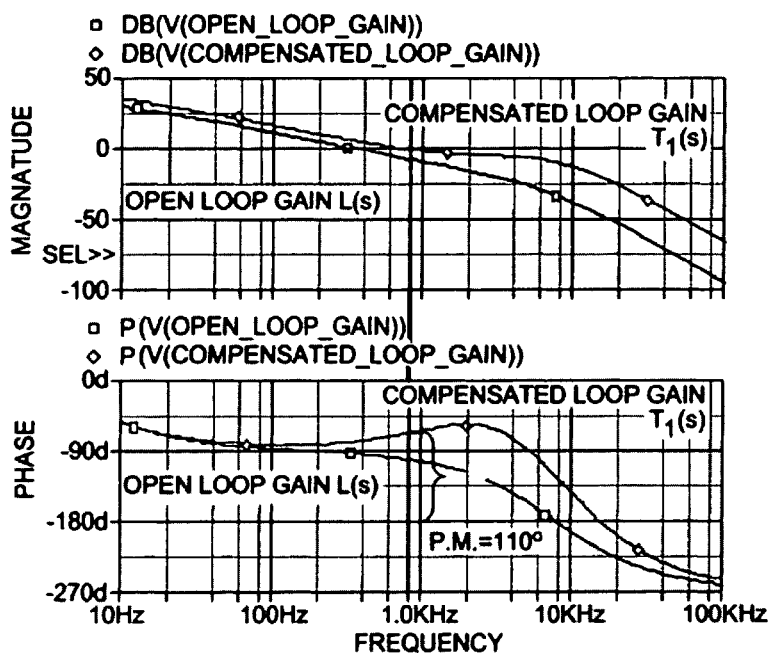
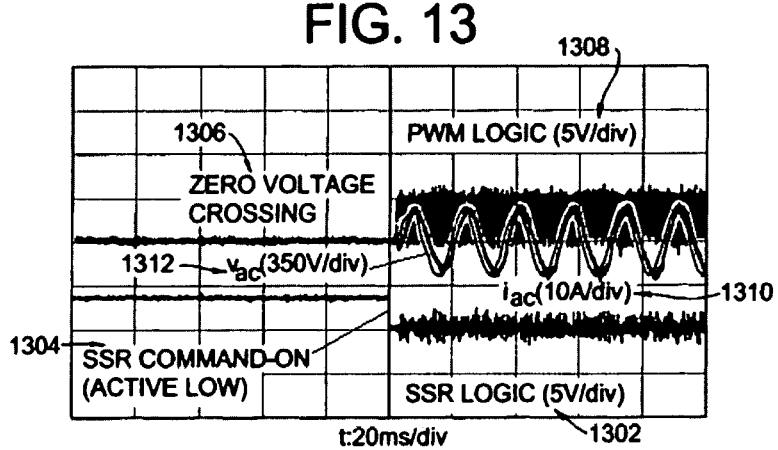

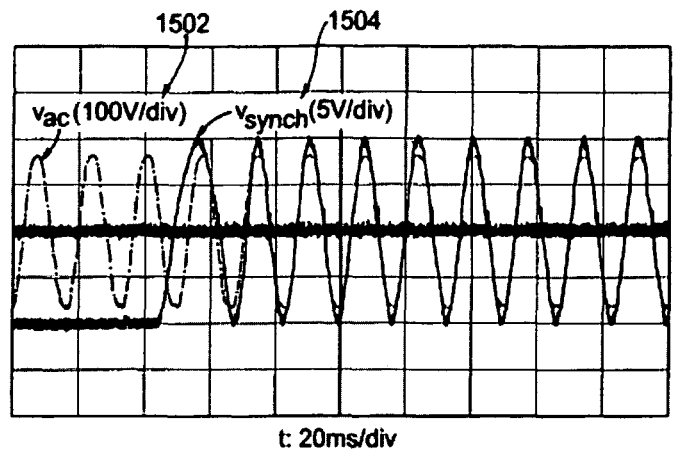
FIG. 15
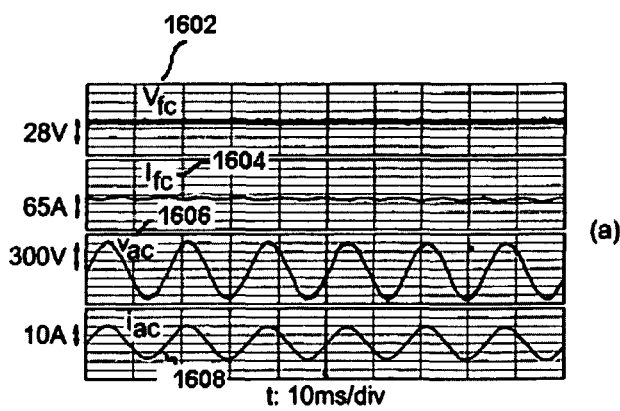
(a)
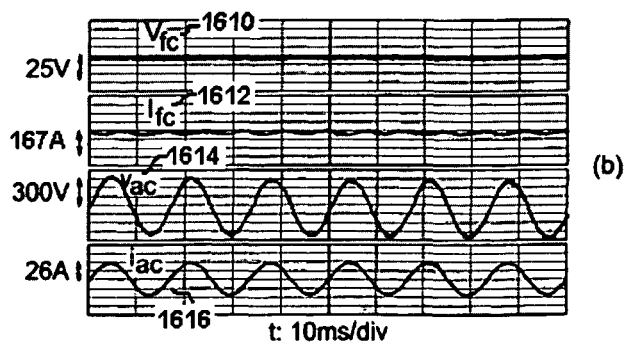
(b)
FIG. 16

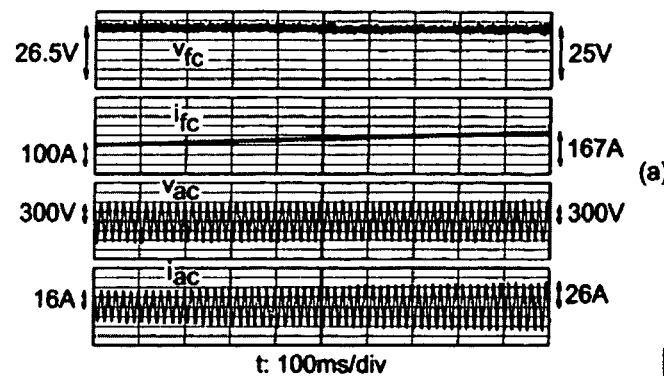
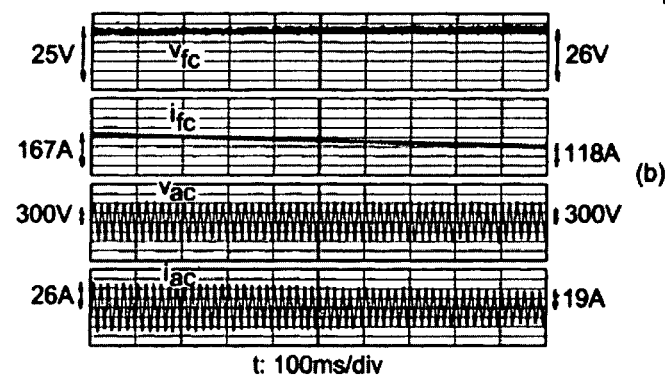
FIG. 17
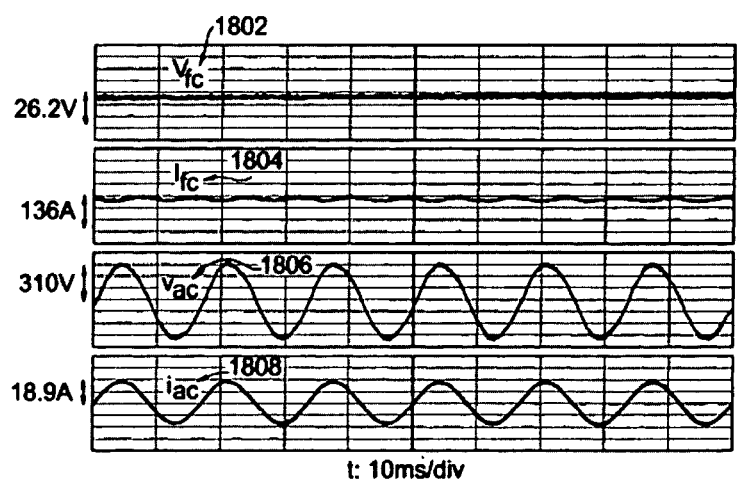
FIG. 18

CONTROL SYSTEM AND METHOD FOR A UNIVERSAL POWER CONDITIONING SYSTEM

REFERENCE TO RELATED APPLICATION

The present application claims the benefit of U.S. Provisional Patent Application No. 60/891,118, filed Feb. 22, 2007, whose disclosure is hereby incorporated by reference in its entirety into the present disclosure.

STATEMENT OF GOVERNMENT INTEREST

This invention was made with government support under Grant No. DE-FC26-02NT41567 awarded by the Department of Energy. The government has certain rights in the invention.

FIELD OF THE INVENTION

The present invention is directed to a current loop control system and in particular to a current loop control system for a power conditioning system.

DESCRIPTION OF RELATED ART

Fuel cell outputs tend to have a slow time constant due to the use of balance-of-plant (BOP) controllers, and thus it is more suitable for a grid-tie system where the load dynamic can be better managed with slow current ramps. The fuel cell power conditioning output, however, suffers from a steady-state error problem, as seen in most single-phase inverters. This steady-state error in AC power output can be decomposed into a magnitude offset, a phase offset, and a current distortion. While a small amplitude offset may not be a concern for utility applications, a phase offset and waveform distortions can significantly affect the output power quality so as to fail to meet power quality standards.

A major cause of the inverter output steady-state error has long been identified as insufficient controller loop gain at a fundamental frequency such as 50 Hz or 60 Hz or at the harmonic frequencies. High control loop gain at the fundamental frequency can reduce the amplitude and phase offsets, while a high loop gain at harmonic frequencies can reduce the output total harmonic distortion (THD). Thus, one solution to the steady-state error problem has been to design a proportional resonant (PR) controller to have an extremely high loop gain at the desired frequencies to reduce the amount of steady-state error. Use of a PR controller, however, may reduce relative stability at compensated frequencies because the solution introduces sudden phase changes caused by a high quality factor.

Another solution to the steady-state error problem has been the use of a single-phase d-q frame transformation method. This frame transformation method has been shown to provide the equivalent effect as that of an infinite loop gain at the fundamental frequency, which effectively eliminates the steady-state error. The frame transformation method also allows control of the real output power and the imaginary output power individually. This method, however, requires the frame transformations in feedback and control signals to be performed within every switching cycle. That requirement demands considerable computational efforts and is difficult to implement with a low-cost digital controller.

The main reason for a steady-state error in a grid-tie inverter is an unwanted current introduced by grid voltage through an undesired admittance path. Because the main purpose of a grid-tie inverter is to send power out to the grid, the desired current should be in phase with the output voltage. While connecting to the grid, the undesired admittance path, however, will contribute a large amount of current that is completely out of phase with the desired current. In a power factor correction (PFC) boost converter, this admittance path has been shown to have a major impact on the waveform distortion due to its leading phase with respect to the line current. A similar effect is seen in the grid-tie inverter, except that the leading phase becomes a lagging phase because the admittance-induced current is against the pulse-width-modulation (PWM) output current. The impact of such lagging phase current is a severe steady-state error.

SUMMARY OF THE INVENTION

It should be apparent that there exists a need for a system and method for compensating for the steady-state error problem in a current loon control for a grid-tie flat cell inverter.

Accordingly, a principal object of the present invention is to eliminate steady-state error by admittance compensation in a current loop controller for a grid-tie fuel cell inverter. The admittance compensation technique of the present invention cancels the unwanted current introduced by grid voltage through an undesired admittance path and avoids low stability margin while maintaining sufficient gain at the fundamental frequency.

It is another object of the present invention to provide an inverter that can function in either grid-tie connection mode or standalone mode so as to provide for a universal power conditioning system.

In order to achieve the above and other objects, a new current loop controller is disclosed for a single-phase grid-tie power conditioning system that can be used under standalone or grid-tie mode. The current loop controller achieves admittance compensation to eliminate the steady-state error problem described above by using an inductor-capacitor-inductor (LCL) filter as the interface between the inverter and the utility grid. The LCL filter also allows the inverter to work in both standalone and grid-tie connection modes, making it a universal inverter. The first set of inductor-capacitor (LC) can be used in standalone mode, and the complete LCL interface can be used for grid-tie mode.

Briefly described, those and other objects and features of the present invention are accomplished, as embodied and fully described herein, by a power conditioning system comprising a power inverter; a filter interface between the power inverter and a power utility grid; a current loop controller; and a solid-state relay for interconnecting the power conditioning system and a utility power grid.

The system includes a power conditioning system wherein the current loop controller is a proportional resonant controller or a second-order lead-lag current controller, among others. The filter is can be an inverter-side filter capacitor or an inductor-capacitor-inductor filter, among others. The power conditioning system includes an inverter-side inductor and a grid-side inductor and an output voltage from the inverter-side inductor providing a feedback voltage and a feedback current to the current loop controller.

With those and other objects, advantages, and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

Preferred embodiments of the invention will be set forth in detail with reference to the drawings, in which:

FIG. 9 is an admittance (Y) plot in the frequency domain with uncompensated admittance term component ($Y_1$) and lagging phase admittance term component ($Y_2$);

FIG. 10 is a current loop gain plot showing a crossover frequency at 700 Hz and phase margin of 110°;

FIG. 12 is a picture of a prototype power conditioning system in a fuel cell system;

FIG. 13 is a waveform diagram of the start-up waveform of the grid-tie inverter operation mode;

FIG. 15 is a waveform diagram of a synchronization waveform;

FIG. 16(a) is a waveform diagram of steady-state test results at a 1.5 kW operating condition;

FIG. 16(b) is a waveform diagram of steady-state test results at a 4 kW operating condition;

FIG. 17(a) is a voltage and current over time diagram showing dynamic power ramping up from 2.5 kW to 4 kW;

FIG. 17(b) is a voltage and current over time diagram showing dynamic power ramping down from 4 kW to 3 kW;

FIG. 18 is a waveform diagram of input and output waveforms in standalone mode under 2.95 kW operating condition;

DETAILED DESCRIPTION OF THE PREFERRED EMBODIMENTS

Figure 1:
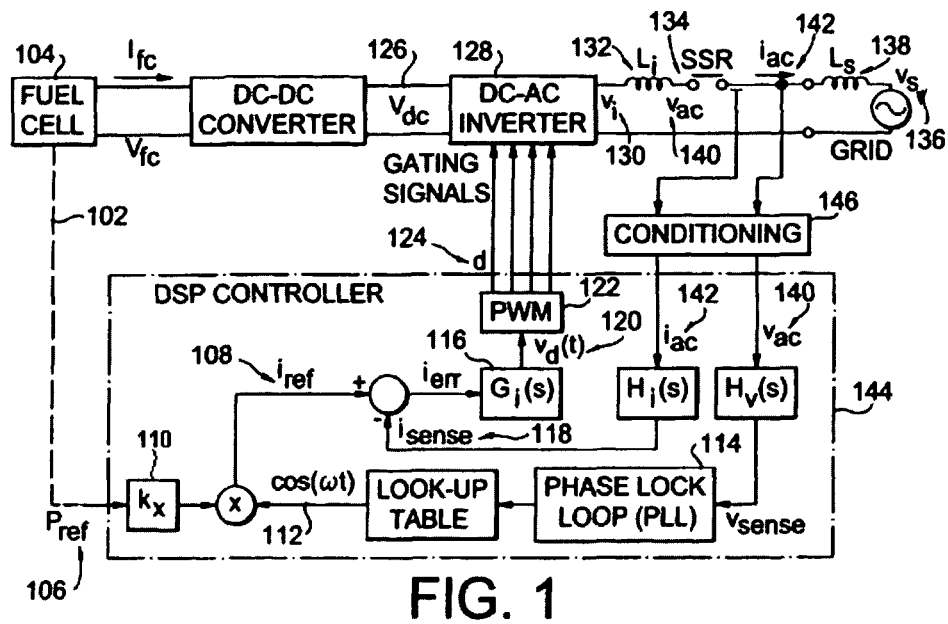
FIG. 1 is a block diagram showing a fuel cell inverter control system with an L filter.

Preferred embodiments of the invention will be set forth in detail with reference to the drawings, in which like reference numerals refer to like elements throughout.

Grid-Tie Inverter Control System Modeling

The admittance path problem described above can be modeled by examining L-filter-based fuel cell power conditioning system (PCS), as shown in FIG. 1. A fuel cell PCS requires that the inverter output be controlled by the fuel cell balance-of-plant (BOP) controller. The dotted line 102 indicates that the fuel-cell 104 side provides the inverter output power command, $P_{ref}$ 106 which is translated into the output current command, $i_{ref}$ 108 by multiplying a scaling factor, $k_x$ 110 and a synchronization signal, cos(ωt) 112 produced by the digital phase lock loop (PLL) 114. The current loop controller, $G_i(s)$ 116 is designed to compensate for the error between the output current command reference $i_{ref}$ 108 and the feedback sensed current, $i_{sense}$ 118. The output of the current loop controller is the duty cycle control signal, $v_d(t)$ 120 which is typically a sinusoidal signal. Feeding the $v_d(t)$ 120 signal to the pulse width modulation (PWM) block 122 results in the output of gate signal, d 124. By feeding this gate signal, d 124 and applying a dc-link voltage, $V_{dc}$ 126 to the inverter 128, an inverter output voltage, $v_i$ 130 will be generated. The inverter 128 power circuit output needs an inverter-side filter inductor, $L_i$ 132 to smooth the current and a Solid-State Relay (SSR) 134 to make a grid interconnection. The utility source voltage, $v_s$ 136 contains a source inductance, $L_s$ 138, and thus the actual grid-tie voltage seen by the inverter 128 is the voltage between $L_i$, 132 and $L_s$ 138, i.e. $v_{ac}$ 140. Both the inverter output current $i_{ac}$ 142 and the interconnect voltage $v_{ac}$ 140 are fed back to the digital signal processor (DSP) 144 through a conditioning circuit 146 for scaling. The $v_{ac}$ 140 waveform contains a large switching ripple with magnitude proportional to the ratio of $L_s$ 138 and $L_i$ 132. The larger induction $L_i$ 132 allows a smaller current ripple, which can be filtered easily without significant filter delay. The filtered and sensed voltage, $v_{sense}$ 148, is used to produce the synchronization signal cos(ωt) 112 through the PLL 114 and the look-up table 150.

Figure 2:
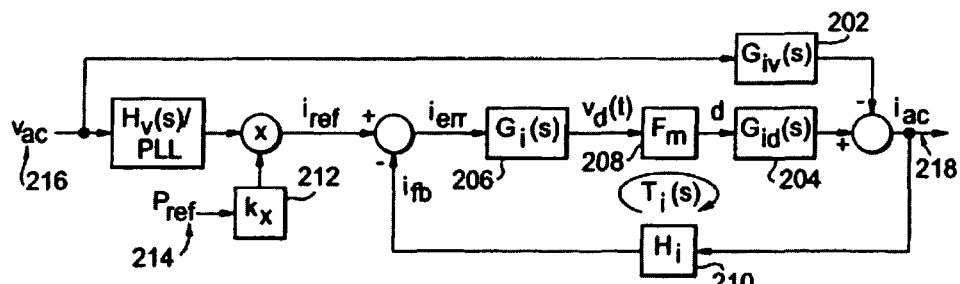
FIG. 2 is a transfer function block diagram showing an inverter control system of a fuel cell PCS.

The above system can be mathematically modeled using transfer functions as shown in the transfer function block diagram of FIG. 2. Turning to FIG. 2, represented therein is an inverter control diagram using transfer function blocks: $G_{iv}$ 202 and $G_{id}$ 204—representing the power stage transfer functions, $G_i$ 206—representing the current loop compensator, $F_m$ 208—representing PWM gain, $H_i(s)$ 210—representing the current sensor gain, and $k_x$ 212—representing the current reference gain. Using the average inverter output voltage $dV_{dc}$, the transfer function blocks can be derived in equation (1).

$$i_{ac} = G_{id}(s)d - G_{iv}(s)v_{ac} \quad (1)$$

where $$G_{id}(s) = \frac{V_{dc}}{r + sL_i}$$

and $$G_{iv}(s) = \frac{1}{r + sL_i}$$

The overall equivalent admittance can be represented in equation (2), $$Y(s) = \frac{i_{ac}(s)}{v_{ac}(s)} = \frac{G_{id}(s)F_m G_i(s)}{1 + T_i(s)} k_x P_{ref} H_v - \frac{G_{iv}(s)}{1 + T_i(s)}, \quad (2)$$

or $$Y(s) = T_{icl} K_x P_{ref} H_v - G_{ivcl},$$

where $T_i = G_{id} F_m H_i G_i$ and $T_{icl} = G_{id} F_m G_i/(1+T_i)$. Defining the overall admittance path as $Y(s) = Y_1(s) + Y_2(s)$ yields:

$$Y_1(s) = T_{icl} k_x P_{ref} H_v \text{ and } Y_2(s) = -G_{ivcl}. \quad (3)$$

The first admittance term, $Y_1$, is the power command $P_{ref}$ 214 generated term, which provides the desired output generated by the inverter. The second admittance term, $Y_2$, is the closed-loop voltage-to-current transfer function from $v_{ac}$ 216 to $i_{ac}$ 218 calculated by assuming that the inverter output voltage $v_t$ equals zero and the SSR is connected to the power grid.

If $G_i(s)$ is a traditional PI compensator, one as described in equation (4):

$$G_i(s) = \frac{\omega_i\left(1 + \frac{s}{\omega_z}\right)}{s\left(1 + \frac{s}{\omega_p}\right)} \quad (4)$$

then $Y_1(s)$ and $Y_2(s)$ can be derived in equations (5) and (6), respectively:

$$Y_1(s) = P_{ref} k_x H_v \quad (5)$$

$$Y_2(s) = -\frac{G_{iv}(s)}{1 + T_i(s)} = \frac{-s}{H_i F_m V_{dc} \omega_i \left(1 + \frac{s}{\omega_z}\right)}, \quad (6)$$

and $Y_2$ becomes a 90° tagging phase below the crossover frequency.

The resulting admittance plot at a 10% power command in the frequency domain when $G_i(s)$ is a traditional PI compensator is shown in FIG. 9. At 60 Hz, $Y_1$ is in phase with $v_{ac}$, and $Y_2$ has a 90° phase lag. Note that the current induced in the $Y_2$ path needs to be multiplied with $v_{ac}$ 216, and thus the resulting current will exceed 0 dB and will be noticeable even at the maximum power command condition. At a low power command, the current induced in $Y_2$ will eventually exceed that in $Y_1$, and thus the impact is very significant. Because the current in the $Y_2$ admittance path tends to reduce the desired current, the resulting steady-state output will be less than the command input, and the situation worsens at lighter load conditions.

If $G_i(s)$ is a double-pole-double-zero lead-lag compensator as set out in equation (7), then $Y_1(s)$ and $Y_2(s)$ can be derived as set out in equations (8) and (9), respectively.

$$G_i(s) = \frac{\omega_i\left(1 + \frac{s}{\omega_z}\right)^2}{\left(1 + \frac{s}{\omega_p}\right)} \quad (7)$$

$$Y_1(s) = P_{ref} k_x H_v \quad (8)$$

$$Y_2(s) = -\frac{G_{iv}(s)}{1 + T_i(s)} = \frac{1}{H_i F_m V_{dc} \omega_i \left(1 + \frac{s}{\omega_z}\right)^2}, \quad (9)$$

and $Y_2$ becomes 180° out of phase below the crossover frequency in equation (9), which worsens the output current cancellation.

Elimination of the Unwanted Admittance Effect

Figure 3:
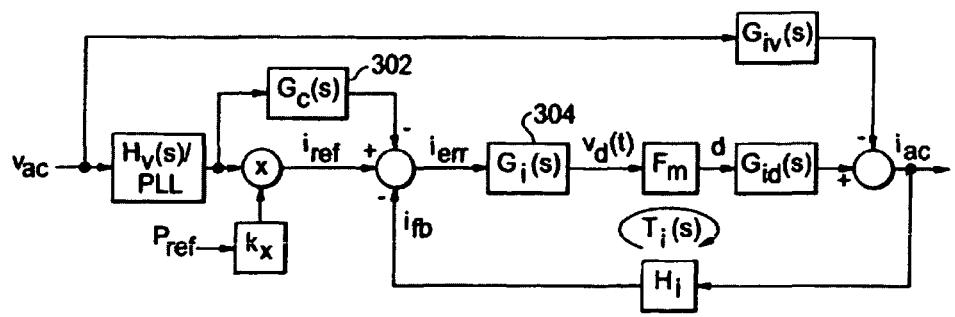
FIG. 3 is a transfer function block diagram showing a current reference admittance compensation method.
Figure 4:
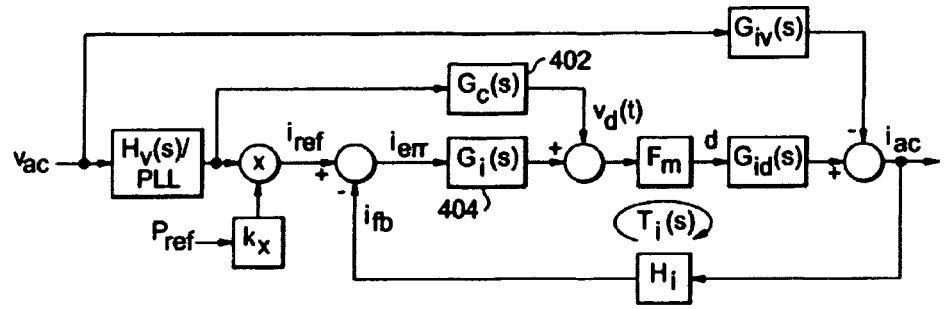
FIG. 4 is a transfer function block diagram showing a lagging phase admittance compensation method.

The separation of the two components of the output admittance suggests methods of eliminating the unwanted term in $Y(s)$. By observing the expression of $Y(s)$, the undesired admittance effect can be eliminated by adding a component that is totally opposed to it. As shown in FIGS. 3 and 4, placing an admittance compensator at differing locations yields two methods of canceling the undesired admittance term. In FIG. 3, the admittance compensator 302 is added at the summing junction before the current loop compensator 304, which can be implemented with either an analog or a digital controller. In this configuration, the compensator transfer function can be derived as shown in equation (10):

$$G_c(s) = -Y_2(s)\frac{1}{H_v(s)T_{icl}(s)} = \frac{1}{H_v(s)V_{dc}F_m G_i(s)} \quad (10)$$

In FIG. 4, the admittance compensator 402 is added after the current loop compensator 404, which can easily be implemented with either an analog or a digital controller, but not with a conventional analog PWM chip. In this case, the compensator transfer function can be further simplified to equation (11):

$$G_c(s) = -Y_2(s)\frac{1}{H_v(s)T_{icl}(s)G_1(s)} = \frac{1}{H_v(s)V_{dc}F_m} \quad (11)$$

The above definition assumes the overall loop gain has sufficient gain at low frequencies (50 or 60 Hz), which is a requirement to lower the steady state error.

Figure 5:
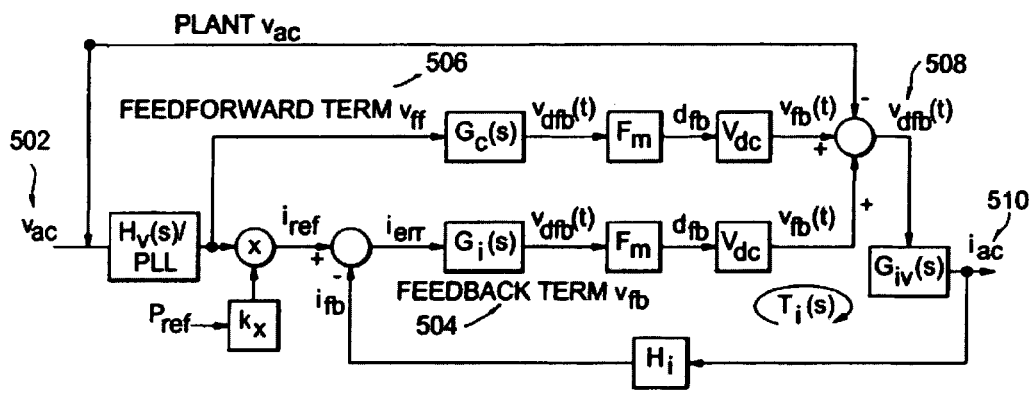
FIG. 5 is a control block diagram for a grid-tie inverter.
Figure 6:
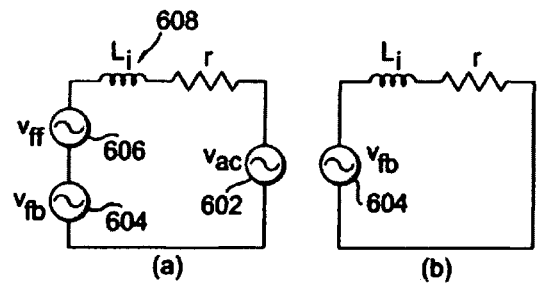
FIG. 6(a) is a power circuit diagram for a grid-tie inverter.
FIG. 6(b) is a power circuit diagram for a grid-tie inverter with admittance compensation.

By rearranging the voltage sources from the plant, the equivalent control block diagram can be shown as FIG. 5. Here, $v_{ac}$ is the voltage source from the grid 502 while the inverter output voltage has two components: a feedback output voltage $v_{fb}(t)$ 504 and a feedforward output voltage $v_{ff}(t)$ 506. Applying the super-position theory, the effective voltage $v_{eff}(t)$ 508 generating the current $i_{ac}$ 510 is the combination of these voltages. As shown in FIG. 6(a), if the admittance compensation is applied properly, the $v_{ac}$ 602 will be cancelled by the added $v_{ff}(t)$ 606. This yields the circuit equivalent to the circuit shown in FIG. 6(b). With this control method, the grid-tie inverter connection can be controlled as a pure inductive load with a simple feedback control.

LCL Filter for the Grid-Tie Inverter

Figure 7:
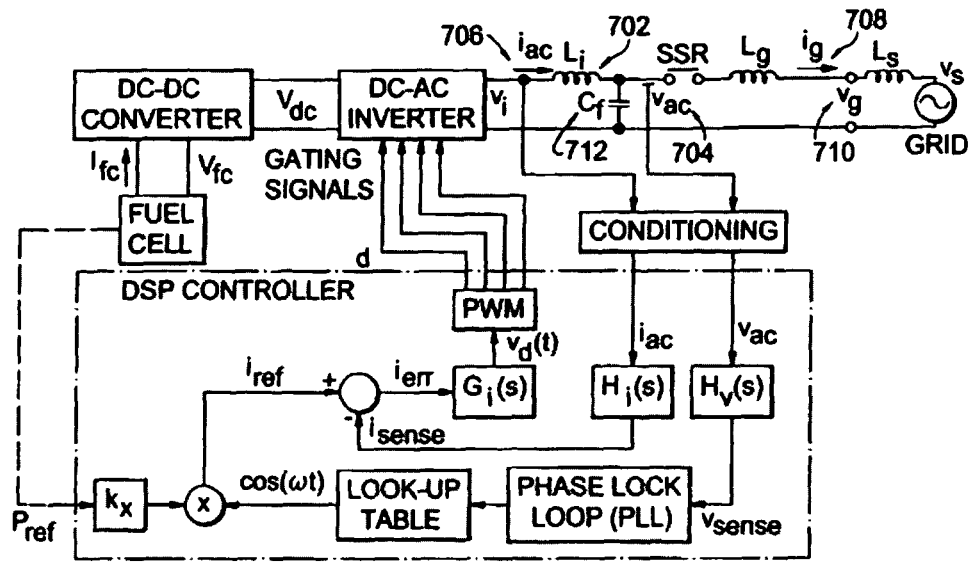
FIG. 7 is a block diagram showing a fuel cell inverter control system with an LCL filter.
Figure 8:
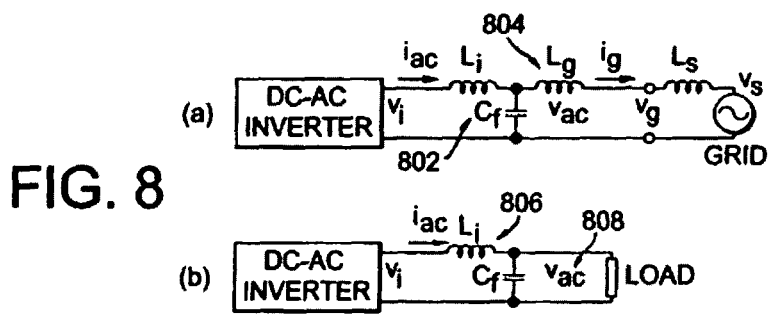
FIG. 8(a) is a power circuit diagram for a universal inverter in grid-tie operation mode.
FIG. 8(b) is a power circuit diagram for a universal inverter in standalone mode.

Generally, grid-tie applications require the designed inverter to meet the current total harmonic distortion (THD) within a specified range. Higher output current quality can be obtained if the output filter is configured as an inductor-capacitor-inductor (LCL) type as shown in FIG. 7. Furthermore, the LCL filter configuration allows the inverter to operate as a universal inverter as shown in FIG. 8. It can not only supply output power to the utility but can also can be used separately as a standalone inverter. For use in a grid-tie connection mode, as shown in FIG. 8(a), the filter capacitor $C_f$ 802 and the grid-side inductor $L_g$ 804 can be a second-order filter for the current being sent to the utility. For use in a standalone operation mode, as shown in FIG. 8(b), the inverter-side inductor $L_i$ 806 and filter capacitor $C_f$ 802 constitute a voltage filter for the inverter output voltage $v_{ac}$ 808. Compared to the L-filter-based inverter described above, the LCL filter configuration allows for more flexible inverter usage and also provides more attenuation of any switching ripple current.

Referring again to FIG. 7, the above described control system is derived by using the output voltage right after the inverter-side inductor $L_i$ 702, $v_{ac}$ 704 as a feedback voltage and using the current through the inductor $L_i$ 702, $i_{ac}$ 706 as the feedback current. In the situation where the LCL filter is replaced with an L filter, there will be four possibilities for sensing position combinations by choosing either $i_{ac}$ 706 or $i_g$ 708 with either $v_{ac}$ 704 or $v_g$ 710 as feedback signals. By selecting the voltage across the filter capacitor $C_f$ 712, $v_{ac}$ 704 and the current through the inductor $L_i$ 702, $i_{ac}$ 706 as feedback signals, the L-filter-based current controller can be easily adapted to a LCL-filter-based current controller.

In designing the LCL filter for use in the inverter system, some design considerations need to be taken into account. The first design consideration is the selection of the components of the LCL filter. First, the inverter-side inductor $L_i$ 702 should be selected according to the ripple current on the inductor. A larger inductance value allows for a smaller inductor switching ripple; however, too large an inductance value will increase the cost, volume and weight of the inductor. Thus, the selection of the inductor value is governed by the trade-off between the ripple current specification and the cost of the component. Second, the filter capacitor $C_f$ 712 is calculated by the cut-off frequency of the $L_i$-$C_f$ second-order filter for the output voltage $v_{ac}$ 704, 808 in the standalone mode. In a preferred embodiment, the cut-off frequency of the $L_i$-$C_f$ filter is suggested to be between five times less than the switching frequency and five times greater than the fundamental frequency. Finally, the grid-side inductance $L_g$ is selected by the cut-off frequency of the $L_i$-$C_f$ second-order filter for the output current $i_g$ of the grid-tie connection mode.

The second design consideration in implementing an LCL filter for the inverter system is the position of the feedback signals. Referring again to FIG. 6(*a*), the control diagram of admittance compensation is derived by using voltages and current across the inverter-side inductor $L_i$ 608. When the LCL filter is replaced with an L filter, there will be four possibilities of sensing position combinations by choosing either current $i_{ac}$ or $i_g$ with either voltage $v_{ac}$ or $v_g$ as feedback signals. By selecting the voltage across the filter capacitor $C_f$, $v_{ac}$ and the current through the inductor $L_i$, $i_{ac}$ as feedback signals, the L-filter-based current controller can be easily adapted to an LCL-filter-based current controller.

Current Loop Controller Design and Simulation

Because the duty-cycle-to-output current transfer function $G_{id}$ shown in equation (1) contains a near-zero-frequency pole, the addition of the traditional I or PI controller to increase the loop gain will make the system unstable for lack of phase margin. A PR control is a good alternative approach for avoiding the use of an integrator while providing high gain at the fundamental frequency or harmonic frequencies. A high quality-factor PR controller, however, may cause a sudden phase change which may also lead to a stability problem. Furthermore, implementing a PR controller with a fixed-point DSP increases computation time. For a 20-kHz switching frequency, for example, such an implementation creates a major computation time issue. With the introduction of admittance compensation, it is possible to design a controller with lead-lag compensation to provide high enough gains at low frequencies and keep the low frequency phase unchanged.

In a tested embodiment of the system, the grid source inductance of the system was measured to be $L_g$=0.8 mH. To avoid a significant noise effect on the sensing signal and to reduce the output current ripple as much as possible, the inverter-side inductance was selected to be $L_i$=3.3 mH, which has an equivalent series resistance of 0.15Ω. The low-frequency pole of the inverter-side inductor, $L_i$ is about 7.2 Hz, or about one decade below 60 Hz. With the filter capacitance chosen as $C_f$=2 μF, which combined with 1, results in a second-order voltage filter at 1.95 kHz for the standalone mode. The grid-side inductance was selected to be $L_g$=0.5 mH, which has an equivalent series resistance of 0.01Ω. The $C_f$ and $L_g$ combination constitutes a second-order current filter at 4.95 kHz for the grid-tie connection mode. Thus the current loop sensor has a gain of $H_i$=0.01667 and two digital filter poles at 9 kHz. The voltage loop sensor has a gain of $H_v$=0.0025 and two digital filter poles at 2 kHz. By selecting the crossover frequency of the compensated loop gain at 700 Hz and a phase margin of 110°, a double-pole-double-zero lead-lag compensator can be designed with the transfer function shown in equation (12).

$$G_i(s) = \frac{\omega_i\left(1+\frac{s}{2\pi f_z}\right)^2}{\left(1+\frac{s}{2\pi f_p}\right)^2} = \frac{2.05\left(1+\frac{s}{2\pi \cdot 1.9k}\right)^2}{\left(1+\frac{s}{2\pi \cdot 7.2k}\right)^2} \quad (12)$$

Using the above current loop controller and system parameters, the open-loop gain L(s) and the compensated loop gain $T_i(s)$ are plotted in FIG. 10. The open loop gain can be represented as $L(s)=F_m H_i G_{id}$ while the compensated loop gain is defined as $T_i(s)=G_i F_m H_i G_{id}$. Although the sampling delay is neglected in this plot, sufficient phase and gain margins guarantee the stability of the system.

Figure 11:
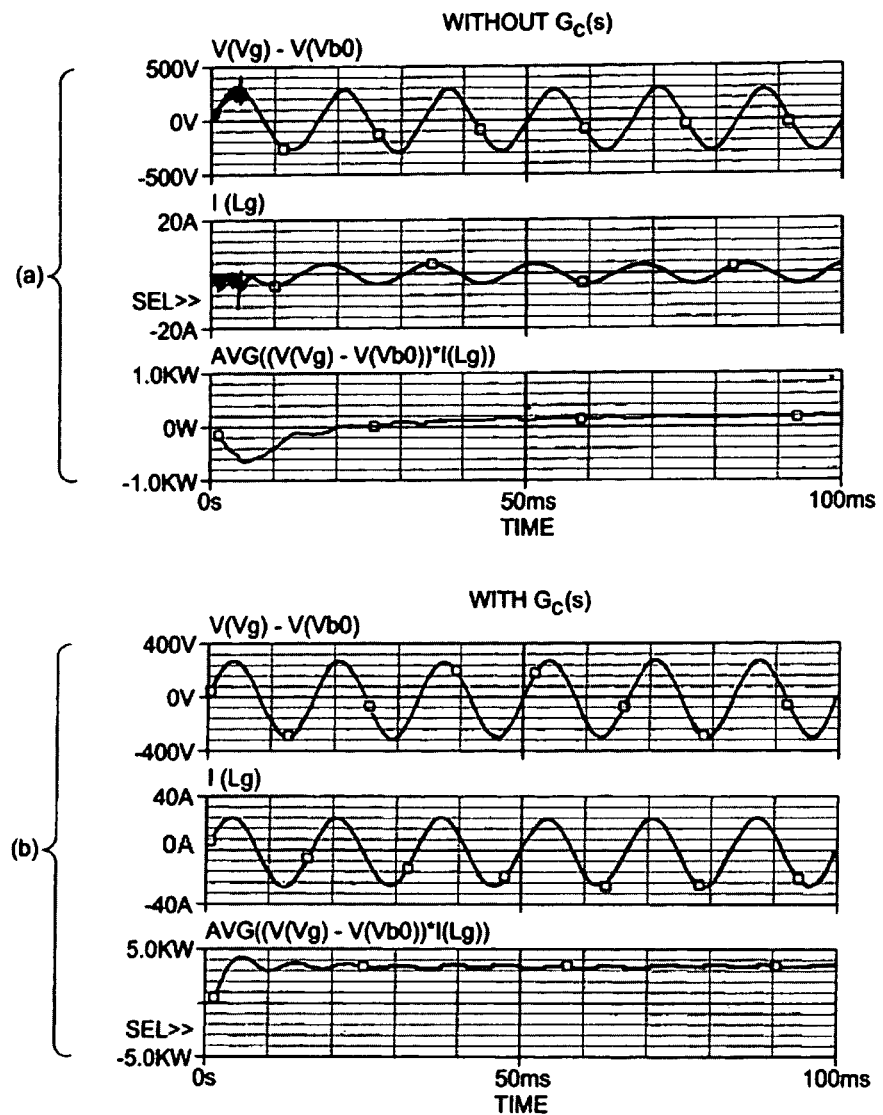
FIG. 11(a) is time-domain simulation result for a tested system without Gc(s) compensation.
FIG. 11(b) is time-domain simulation result for a tested system with Gc(s) compensation.

FIG. 11 shows the comparison of the simulation results of FIG. 10 with and without admittance compensation at 3.5 kW in the time domain. Without the admittance path compensation, power flows back to the inverter during the first simulation cycle, which will cause the dc bus capacitor to be charged and result in catastrophic failure. Even though the steady-state power sent to the power grid is positive, the output voltage and current are out of phase and the transferred power is only 200 W, a 94% error. With $G_c(s)$ compensation, the output waveforms are in phase and the transferred power is 3.72 kW, a 6% error, which is consistent with the Bode plot shown in FIG. 10, where the gain at 60 Hz is about 24 dB. From the simulation result, it is readily apparent that the steady-state error has been greatly reduced by the admittance compensation technique disclosed herein using only a lead-lag compensator. Compared to traditional PR controllers, which have very high gains and sharp phase changes at resonant frequencies, it is possible to add a wider-band-and-damped PR controller with admittance compensation to further improve the steady-state error. With admittance compensation, the wider-band-and-damped PR controller can provide sufficient gain boost without sharp phase changes to avoid a stability problem.

Experimental Verification

A PCS prototype, shown in FIG. 12, comprising of a DC-DC converter to boost the fuel cell voltage from about 25V to 400V and a dc-ac inverter that produces 208 Vrms ac output for the grid connection was tested with a solid oxide fuel cell (SOFC) simulator 1202, which mimics an actual low-voltage SOFC that has a stack of 36 cells operating at 1000° C. FIG. 12 shows a photograph of the test setup with the PCS prototype 1204 and associated instrumentation. A precision current shunt 1206 is used to calibrate the current measurement. The front panel of the case is open to show the DSP board 1208 which, in the prototype embodiment, is an in-house developed TMS320F2812 control board containing all necessary interfaces and signal conditioning circuits.

FIG. 13A shows the start-up waveform of the grid-tie inverter operation. The SSR logic 1302 may be commanded on 1304 at any time, but the actual switch-on point is at the zero crossing 1306. The PWM logic signal 1308 will not start until zero-voltage crossing 1306. Thus the output current $i_{ac}$ 1310 follows the grid voltage $v_{ac}$ 1312 after zero crossing 1306, and the power transfer is quite smooth. No significant voltage or current glitches are observed.

Figure 14:
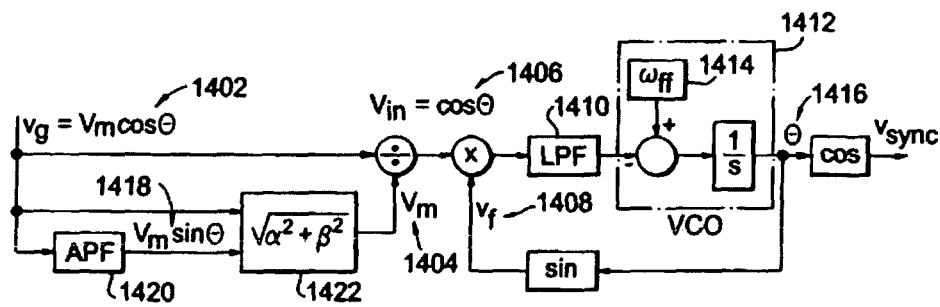
FIG. 14 is a block diagram of a software phase locked loop structure.

The DSP software is designed to synchronize the grid voltage and to lock the phase for the PWM logic before commanding the SSR to turn on. The synchronization may be implemented with zero-crossing detection or a phase-locked loop (PLL). In our case, a simple software phase-locked loop (SPLL) is adopted. FIG. 14A shows the block diagram of the SPLL structure. Here, the grid-voltage signal $v_{ac}$ 1402 is divided by its peak voltage $v_m$ 1404 to obtain a PLL input voltage with unity magnitude, or $v_{in}=\cos\theta$ 1406. By multiplying $v_{in}$ 1406 and the feedback voltage, $v_f$ 1408, the phase error can be detected by its offset voltage. A low pass filter (LPF) 1410 filters the high-frequency portion and converts the phase error to a voltage signal. The voltage controlled oscillator (VCO) 1412, which consists of a feed-forward angular frequency 1414, $\omega_{ff}$, and an integrator, provides the phase out, $\theta$ 1416. The orthogonal signal, $V_m \sin\theta$ 1418, can be generated from the voltage $v_{ac}$ or $V_m \cos\theta$ 1402, through an all pass filter (APF) 1420, which provides the same magnitude, but a 90° phase delay signal. The square math block 1422 provides the peak voltage, $v_m$ 1404, of $v_{ac}$ 1402 shown in equation (13).

$$v_m = \sqrt{V_m^2 \cos^2\theta + V_m^2 \sin^2\theta} \qquad (13)$$

FIG. 15A shows $v_{ac}$ 1502 and $V_{synch}$ 1504, which is the internal synchronizing signal. Here $v_{synch}$ 1504 is obtained through the external digital-to-analog converter (DAC) circuit, which adds an extra time delay in addition to the DSP sampling time. Nevertheless, the output of the SPLL does not show any appreciable delay and provides a pure sinusoidal signal to the controller that properly synchronizes the grid voltage $v_{ac}$ 1502. The startup locking takes just a little over one fundamental cycle.

The main difference between photovoltaic (PV) power systems and fuel cell power systems is the origin of the power command source. The power command of a PV system can be determined by the maximum power tracking algorithm. In a fuel cell system, the fuel cell BOP controller determines the power command. In our case, the fuel cell controller provides a power command from 0 to 10 V, which represents 0 to 5 kW.

FIG. 16(a) shows experimental results at a 1.5-kW steady-state condition. The waveforms indicate that the fuel cell voltage 1602 $v_{fc}$=28 V, the fuel cell current 1604 $I_{fc}$=65 A, the output voltage 1606 $v_{ac}$=300 V peak or 212 Vrms, and the output current 1608 $i_{ac}$=10 A peak or 7 A rms. FIG. 16(b) shows experimental results at a 4 kW steady-state condition. The waveforms indicate that the fuel cell voltage 1610 $v_{fc}$=25 V, the fuel cell current 1612 $I_{fc}$=167 A, the output voltage 1614 $v_{ac}$=300 V peak or 212 Vrms, and the output current 1616 $i_{ac}$=26 A peak.

It should be noted that without the proposed admittance compensation, the output power would never reach 4 kW for the maximum setting of 5 kW. The disclosed admittance compensation technique, along with the lead-lag current loop controller, however, can give a nearly matched power setting. The experimental result also indicates that the entire PCS efficiency at 4 kW is about 94%.

For dynamic power transfer conditions, a slow ramping command is necessary because of the slow fuel cell BOP control dynamic. FIG. 17(a) shows the power ramping up from 2.5 kW to 4 kW within 1 s. The output current is increased from 16 A peak to 26 A peak, and the fuel cell current is increased from 100 A to 167 A. The fuel cell voltage is reduced from 26.5 V to 25 V. FIG. 17(b) shows the power ramping down from 4 kW to 3 kW. The output current is decreased from 26 A peak to 19 A peak and the fuel cell current is decreased from 167 A to 118 A. The fuel cell voltage is increased from 25 V to 26 V.

Figure 19:
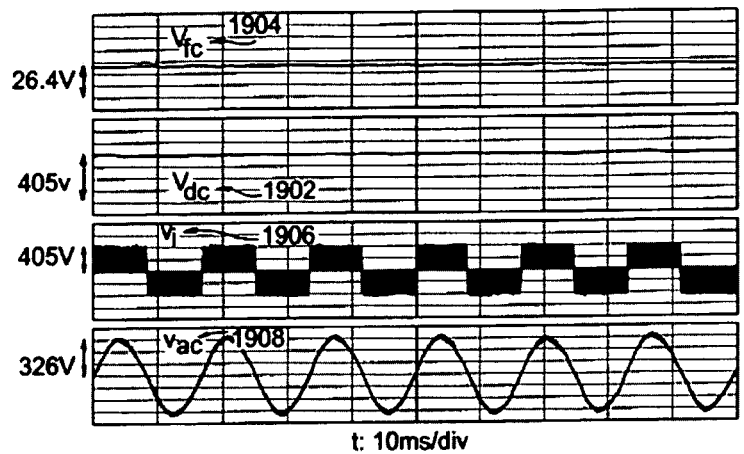
FIG. 19 is a waveform diagram of voltages in standalone mode under 2.95 kW operating condition.

FIG. 18 shows the experimental results under 2.95 kW standalone mode operation. The waveforms indicate that the fuel cell voltage 1802 $V_{fc}$=26.2 V, the fuel cell current 1804 $I_{fc}$=136 A, the output voltage 1806 $v_{ac}$=310 V peak or 219 V rms, and the output current 1808 $i_{ac}$=18.9 A peak or 13.4 A rms. The system also includes a 500Ω discharging resistor at the dc-link side to ensure the safety of the experiment. The results show that the inverter works well in the standalone mode, where the output voltage 1806 and the current 1808 are fairly clean. It is recommended during the experimental stage to test the inverter in the standalone mode to verify that the inverter hardware is functioning properly before connecting to the grid. The LCL filter connection allows for universal inverter operations so that the changes between the standalone and the grid-tie modes can be done without any hardware modification. FIG. 19 shows the voltage waveforms under similar test conditions of FIG. 18. By operating the front-end DC-DC converter, the dc-link voltage 1902 $v_{dc}$ is boosted about 15.3 times from the input fuel cell voltage 1904 $v_{fc}$. Note that, although the inverter voltage 1906 $v_i$ contains a lot of high-frequency switching noise, the output voltage 1908 $v_{ac}$ is clean due to the effect of the designed LC filter.

Figure 20:
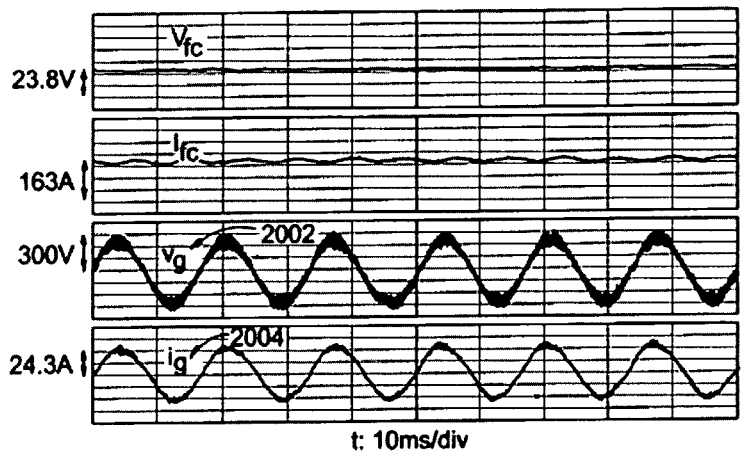
FIG. 20 is a waveform diagram of input and output waveforms in a grid-tie connection mode at 3.65 kW output.
Figure 21:
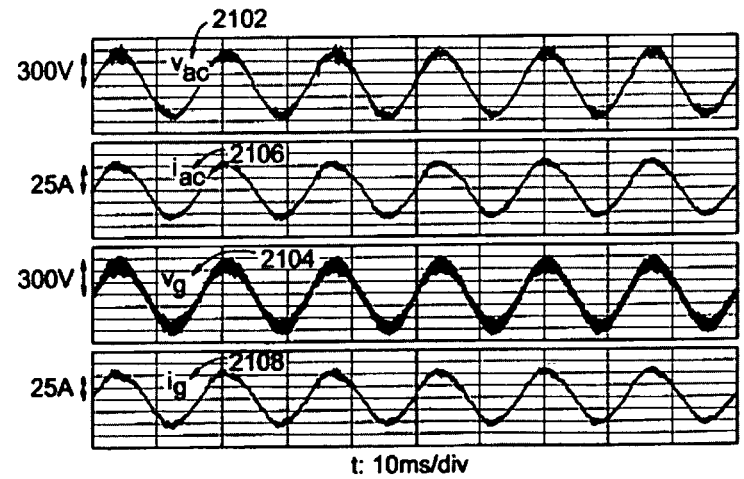
FIG. 21 is a waveform diagram of measured waveforms before and after an LCL filter in a grid-tie connection mode at 3.65 kW output.

FIG. 20 shows the experimental results under a 3.65-kW grid-tie mode operation. The waveforms indicate that the output voltage 2002 $v_g$ and the current 2004 $i_g$ are almost in phase and sinusoidal which suggests that the designed PCS operates well in the grid-tie-connection mode. One should be aware that the output grid voltage 2002 $v_g$ is highly corrupted by noise, particularly electromagnetic interference (EMI) noise produced by the SOFC simulator and the inverter switching noise. However, the ac output current 2004 $i_g$ is clean because there is a sufficiently large inductor in between. FIG. 21 shows experimental waveforms before and after the LCL filters. The voltage across the capacitor 2102 $v_{ac}$ contains less switching ripple than the voltage $v_g$ 2104, which makes the voltage $v_{ac}$ 2102 a better feedback signal with respect to noise. Because the value of the capacitor is not large in order to reduce phase lead in the output current, the difference of the currents $i_{ac}$ 2106 and $i_g$ 2108 is almost negligible.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A power conditioning system adapted to a power inverter such that said power inverter is capable of operating in either a standalone mode or a grid-tie mode, said power conditioning system comprising:

a filter having at least one inductor and at least one capacitor, wherein the filter functions as an interface between said power inverter and a power utility grid when said power inverter operates in said grid-tie mode, said inductor-capacitor-inductor filter comprises an inverter-side inductor from which a pair of inverter-side feedback signals are generated comprising an output voltage, and an output current; and a current loop controller for providing an admittance compensation correction factor to eliminate steady-state error when said power inverter operates in said grid-tie mode, said admittance compensation correction factor is derived from said pair of inverter-side feedback signals; and a means for impermanently interconnecting said power conditioning system to said utility power grid.

2. The power conditioning system of claim 1, wherein the current loop controller is a proportional resonant controller.

3. The power conditioning system of claim 1, wherein the current loop controller is a second-order lead-lag current controller.

4. The power conditioning system of claim 1, wherein the filter interface further comprises an inverter-side filter capacitor.

5. The power conditioning system of claim 1, further comprising one or more circuit elements for feeding back signals from the filter interface to the current loop controller.

6. The power conditioning system of claim 1, wherein the filter is an inductor-capacitor-inductor filter.

7. The power conditioning system of claim 6, wherein the inductor-capacitor-inductor filter has an inverter-side inductor and a grid-side inductor and an output voltage from the inverter-side inductor provides a feedback voltage and a feedback current to the current loop controller.

8. The power conditioning system of claim 6, further comprising a plurality of circuit elements for feeding back an inverter output current and a utility power grid voltage to the current loop controller.

9. The power conditioning system of claim 1, wherein the means for impermanently interconnecting said power conditioning system to said utility power grid comprises a solid state relay.

10. The power conditioning system of claim 1, wherein the power conditioning system is a fuel cell power conditioning system.

11. A system for eliminating a steady-state error caused by an undesired admittance path in a current loop controller for a grid-tie inverter, the system comprising:
    an admittance compensation means for avoiding low stability margin while maintaining sufficient gain at a fundamental frequency; and a means for operating in at least one of a grid-tie connection mode or a standalone operation mode, and
    an inductor-capacitor-inductor filter that functions as an interface between said grid-tie inverter and a power utility grid when said grid-tie inverter operates in said grid-tie mode, said inductor-capacitor-inductor filter comprises an inverter-side inductor from which a pair of inverter-side feedback signals are generated comprising an output voltage, and an output current; and
    a current loop controller for providing an admittance compensation correction factor to eliminate steady-state error when said grid-tie inverter operates in said grid-tie mode, said admittance compensation correction factor is derived from said pair of inverter-side feedback signals; and
    a means for impermanently interconnecting said power conditioning system to said utility power grid.

12. The system of claim 11, wherein the grid-tie inverter is a fuel cell grid-tie inverter.

13. A method for admittance compensation in a power conditioning system having a grid-tie inverter, the method comprising the steps of:
    receiving an inverter output power command at a digital signal processor;
    multiplying the inverter output power command by a scaling factor and a synchronization signal produced by a digital phase lock loop;
    feeding back a utility power grid voltage and a feedback sensed current from the grid-tie inverter to the current loop controller;
    compensating at a current loop controller for an error between an output current command and the feedback sensed current;
    outputting from the current loop controller a duty cycle control signal;
    feeding the duty cycle control signal to a pulse width modulation block;
    outputting from the pulse width modulation block a gate signal;
    feeding the gate signal and applying a dc-link voltage to the grid-tie inverter;
    outputting a power circuit output from the grid-tie inverter to an inverter-side filter inductor; and
    interconnecting the power circuit output to a utility power grid through a solid-state relay.

14. The system of claim 1, wherein the current loop controller is configured to cancel a current introduced by grid voltage through an admittance path in the power inverter.

15. The system of claim 11, wherein the admittance compensation means is configured to cancel a current introduced by grid voltage through the undesired admittance path.

* * * * *